US008635600B2

(12) United States Patent
Lakshminarayanachar et al.

(10) Patent No.: US 8,635,600 B2
(45) Date of Patent: Jan. 21, 2014

(54) SYSTEMS AND METHODS FOR VIRTUAL MACHINE THREAD TRACING

(75) Inventors: Venkataraghavan Lakshminarayanachar, Karnataka (IN); Prashanth K. Nageshappa, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 12/625,536

(22) Filed: Nov. 24, 2009

(65) Prior Publication Data

US 2011/0126172 A1 May 26, 2011

(51) Int. Cl.
| | |
|---|---|
| G01B 3/22 | (2006.01) |
| G01B 13/16 | (2006.01) |
| G06F 13/00 | (2006.01) |
| G06F 15/177 | (2006.01) |
| G06F 9/44 | (2006.01) |
| G06F 9/45 | (2006.01) |
| G06F 9/46 | (2006.01) |
| G06F 3/00 | (2006.01) |

(52) U.S. Cl.
USPC ........... 717/125; 702/168; 711/170; 715/736; 717/124; 717/128; 717/158; 718/107; 719/313

(58) Field of Classification Search
None
See application file for complete search history.

(56) References Cited

U.S. PATENT DOCUMENTS

| | | | | |
|---|---|---|---|---|
| 6,226,787 B1 * | 5/2001 | Serra et al. | ..................... | 717/125 |
| 6,457,142 B1 * | 9/2002 | Klemm et al. | ............. | 714/38.12 |
| 6,738,965 B1 * | 5/2004 | Webster | ......................... | 717/128 |
| 7,284,238 B2 | 10/2007 | Inagaki et al. | | |
| 7,367,025 B1 | 4/2008 | Nikolov et al. | | |
| 7,370,171 B1 * | 5/2008 | Jeyaram | ........................ | 711/170 |
| 2003/0004683 A1 * | 1/2003 | Nemawarkar | ................ | 702/186 |
| 2005/0138629 A1 * | 6/2005 | Samra | ........................... | 718/107 |
| 2006/0200806 A1 | 9/2006 | Tasinga | | |
| 2007/0168968 A1 * | 7/2007 | Bates et al. | .................... | 717/124 |
| 2007/0180439 A1 * | 8/2007 | Sundararajan et al. | ........ | 717/158 |
| 2008/0127108 A1 * | 5/2008 | Ivanov et al. | .................. | 717/128 |
| 2008/0201642 A1 * | 8/2008 | Chong et al. | ................... | 715/736 |
| 2009/0049429 A1 * | 2/2009 | Greifeneder et al. | ......... | 717/128 |
| 2009/0089766 A1 | 4/2009 | Day et al. | | |
| 2009/0119493 A1 | 5/2009 | Venkitachalam et al. | | |
| 2009/0193430 A1 * | 7/2009 | Chao | ............................. | 719/313 |
| 2009/0320000 A1 * | 12/2009 | Saxe et al. | ..................... | 717/128 |

OTHER PUBLICATIONS

Marcel Harkema et al., JPMT: A Java Performance Monitoring Tool, 2003, [Retrieved on Oct. 5, 2012]. Retrieved from the Internet: <URL: http://doc.utwente.nl/47252/1/harkema03jpmt.pdf> 13 Pages (1-13).*

Katharina Mehner, JaVis: A UML-Based Visualization and Debugging Environment for Concurrent Java Programs, 2002, [Retrieved on Aug. 28, 2013]. Retrieved from the internet: <URL: http://link.springer.com/content/pdf/10.1007%2F3-540-45875-1_13.pdf> 13 Pages (163-175).*

(Continued)

*Primary Examiner* — Don Wong
*Assistant Examiner* — Anibal Rivera
(74) *Attorney, Agent, or Firm* — Ference & Associates LLC (57) ABSTRACT

Embodiments of the invention broadly contemplate systems, methods, apparatuses and program products providing a mechanism in a run-time environment or Virtual Machine (VM) which enables a user to specify the combination of method(s) and thread(s) the user wants to collect traces for, without having to make any modifications to the application source code.

14 Claims, 4 Drawing Sheets

(56) References Cited

OTHER PUBLICATIONS

Erik Putrycz, Using Trace Analysis for Improving Performance in COTS systems, 2004, [Retrieved on Aug. 28, 2013]. Retrieved from the internet: <URL: http://www.umsl.edu/~mshpqf/p68-putrycz.pdf> 13 Pages (1-13).*

Hamou-Lhadj, A., et al., "A survey of trace exploration tools and techniques", Proceedings of the 2004 of the Centre for Advanced Studies on Collaborative Research, CASCON 2004, Oct. 5-7, 2004, 14 pages, IBM Press 2004, Markham, Ontario, Canada.

Sweeney, P., et al., "Using Hardare Performance Montors to Understand Behavior of Java Applications", VM'04 Proceedings of the 3rd conference on Virtual Machine Research and Technology Symposium, May 6-7, 2004, 16 pages, vol. 3, USENIX Association, Berkley, California, USA.

Harkema, M., et al., "Performance Monitoring of Java Applications", WOSP '02 Proceedings of the 3rd Annual Workshop on Software and Performance, Jul. 24-26, 2002, pp. 114-127, ACM, Rome, Italy.

* cited by examiner

SYSTEMS AND METHODS FOR VIRTUAL MACHINE THREAD TRACING

BACKGROUND

The subject matter generally relates to thread tracing in a run-time environment or Virtual Machine (VM) such as, a Java® Virtual Machine in computer systems. For specific method calls, it is common that several methods are written for generic purposes and are used in various contexts by various threads. If a programmer wishes to trace specific method calls only when a specific thread runs it, there is currently no easy way to do so.

With debugging threads in a non-VM situation, it is common that thread information is gathered/printed when entering a function/method. However, enabling/outputting traces only if a function is executed on a particular thread is not done. However, there are several approaches that employ post processing of the superset trace output to filter out trace entries belonging to specific methods. Unfortunately, these approaches require complex procedures, such as modification of the source code.

In a non-VM situation, consider having C code and wanting to add entry/exit traces to a few functions. In such a case, one has to resort to modifying the source code and recompile or use some binary modification to patch the assembly code to add more logic into the binary to achieve this.

BRIEF SUMMARY

Embodiments of the invention broadly contemplate systems, methods, apparatuses and program products providing a mechanism in a run-time environment or Virtual Machine (VM) which enables a user to specify the combination of method(s) and thread(s) the user wants to collect traces for, without having to make any modifications to the application source code. With various embodiments of the invention, only the trace data needed is collected, without modifying any source code. Hence the overhead of tracing is greatly reduced.

In summary, one aspect of the invention provides an apparatus comprising: one or more processors; and a computer readable storage medium having computer readable program code embodied therewith and executable by the one or more processors, the computer readable program code comprising: computer readable program code configured to select a method for tracing; computer readable program code configured to select a thread for tracing; and computer readable program code configured to output thread-specific tracing data in response to the thread selected invoking the method selected in one of a run-time environment and a virtual machine.

Another aspect of the invention provides a method comprising: selecting a method for tracing; selecting a thread for tracing; and outputting thread-specific tracing data in response to the thread selected invoking the method selected in one of a run-time environment and a virtual machine.

A further aspect of the invention provides a computer program product comprising: a computer readable storage medium having computer readable program code embodied therewith, the computer readable program code comprising: computer readable program code configured to select a method for tracing; computer readable program code configured to select a thread for tracing; and computer readable program code configured to output thread-specific tracing data in response to the thread selected invoking the method selected in one of a run-time environment and virtual machine.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

In a non-VM situation, there are several approaches to provide tracing information for diagnostics. However, the inventors have recognized significant drawbacks in these conventional approaches. For example, consider C code in which it is desirable to add entry/exit traces to few functions. Currently, a programmer has to resort to modifying the source code and recompile or use some binary modification to patch the assembly code to add more logic into the binary to achieve this.

One can trace by modifying the source code to conditionally output the trace for only thread(s) of interest. However, as described herein, the inventors have identified several problems with such an approach, not the least of which is that the programmer will often not have access to the source code, making modification impossible.

"Strace" is a conventional approach to tracing. Strace can be used to attach to a particular thread and the trace output will be limited to that particular thread only. In this approach, during the development of each system call the developer/ programmer needs to introduce "tracepoints" (along with the logic to check for process-id, et cetera) and these tracepoints are enabled when strace is used. However, any other application call/function cannot be traced using strace. Moreover, the programmer must introduce the tracepoints if they do not exist already, which requires source code modifications.

"Dprobes" is another conventional approach to tracing. Dprobes on LINUX can do per process instrumentation as well. Using "dprobes" a binary modification (inserting instructions) is employed, which can be used in Java® VM as well (using byte code instrumentation). However, this requires knowledge of Java® byte code instructions, which cannot be expected of regular Java® application programmers. The effort that is required for actually doing something like this (that is, using byte code modification) is quite large in practice and therefore intolerable.

Current approaches to tracing in a VM environment involve tracing the methods for all the threads which results in a large amount of trace data, and filtering this data. The general steps for using such an approach are as follows. First, identify the methods one is interested in tracing. Next, set the options to trace these methods. Finally, a trace is generated for all the hits of the method(s) specified. Depending on the frequency of usage of these methods in the system, most of the resultant trace data may be from threads other than the actual thread of interest. Again, this results in a huge amount of trace data that needs to be post-processed to filter the entries by "running thread" to get method hits for the thread of interest.

A related approach has provided a Java® VM including an interpreter in an object-oriented system to provide trace information about specific method calls. Once specified, these methods will be traced no matter on which thread the specified method is executed.

Accordingly, the inventors have recognized a need for thread-specific tracing in a VM environment. Embodiments of the invention provide such thread-specific tracing.

The description now turns to exemplary embodiments of the invention. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
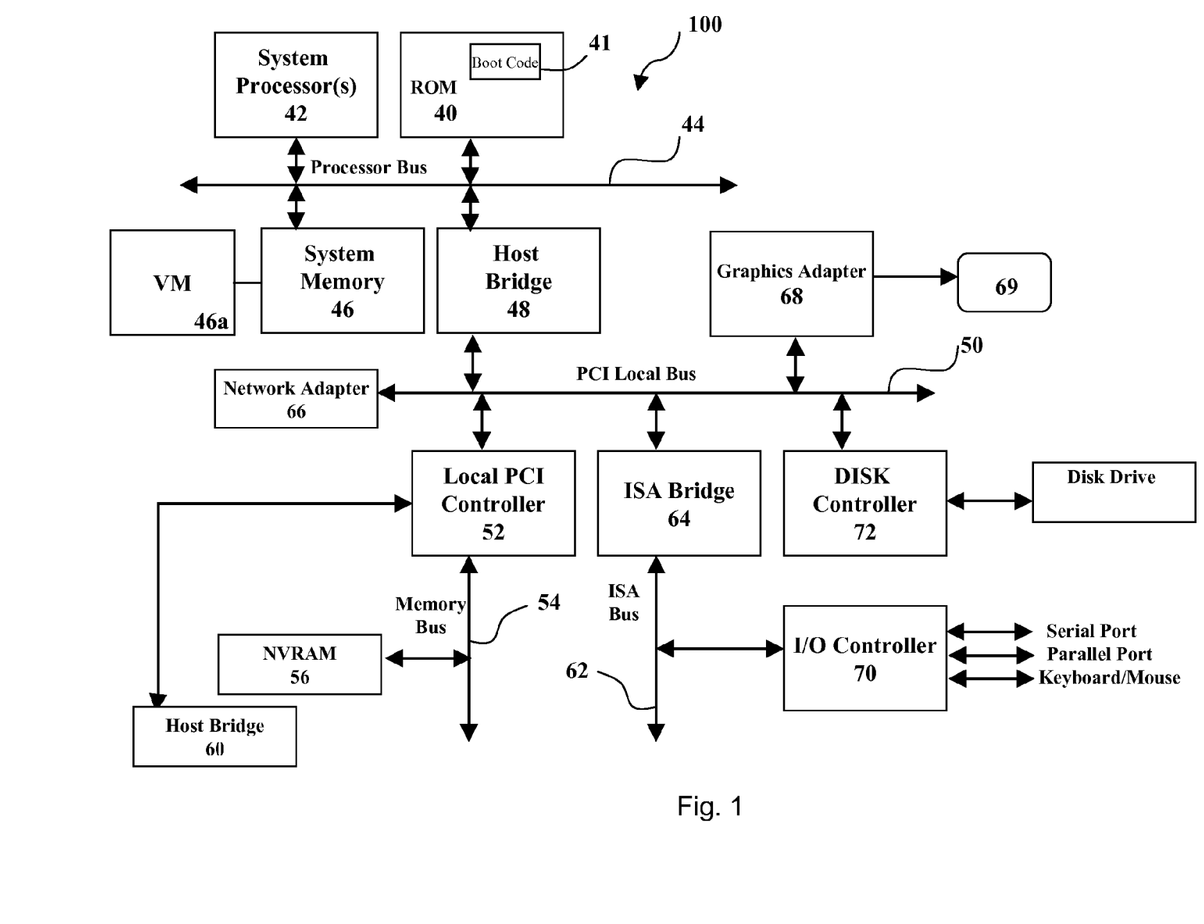
FIG. 1 illustrates a computer system according to an embodiment of the invention.

Referring now to FIG. 1, there is depicted a block diagram of an illustrative embodiment of a computer system 100. The illustrative embodiment depicted in FIG. 1 may be an electronic device such as a desktop computer, a workstation computer, a laptop computer, a mobile computing device, and the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. A virtual machine (VM) 46a can for example be implemented to provide a runtime environment for one or more applications (a virtual machine is generally above the Operating System and below the application layer for any application software stack; however, there are virtual machine implementations which sit directly on top of hardware as well). System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

Figure 2:
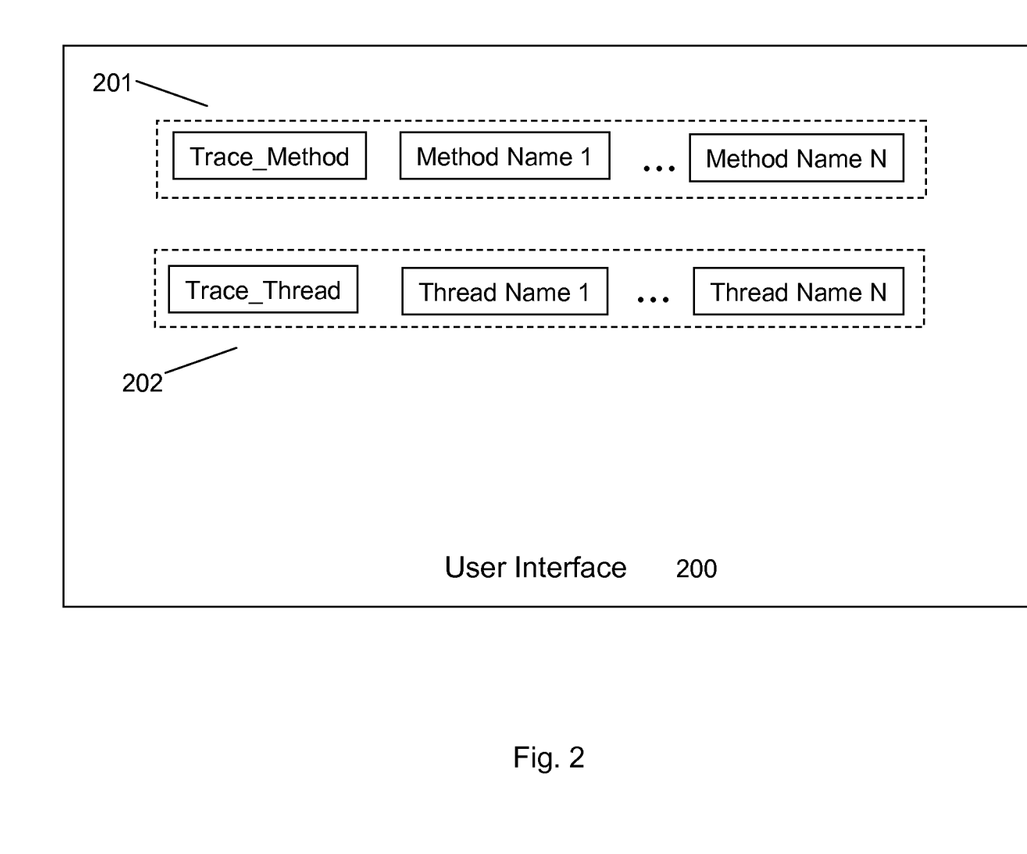
FIG. 2 illustrates a user interface for selecting methods and threads to trace an embodiment of the invention.

Referring to FIG. 2, an embodiment of the invention provides a trace option. A trace option (presented in a user interface 200) that is thread specific and therefore results in the collection of far less trace data (because the trace is more specific and focused to the thread of interest to the programmer) is generally as follows.

trace_method=method_name1[:method_name2][:method_name3] 201;

trace_thread=thread_name1[:thread_name2][:thread_name3] 202;

where method_name is a fully qualified name of the method to be traced and thread_name is a name of the thread on which tracing will be done upon hitting method_name.

For example:

trace_method=java/lang/String.indexOf:java/lang/String. length trace_thread=Deferred Alarm Manager:Reference Handler:Thread-82

The above options will result in tracing functions:

java/lang/String.indexOf( ) and java/lang/String.length( ), only when they are executed on threads which have their names as "Deferred Alarm Manager", "Reference Handler" and "Thread-82" only, and not on any other threads.

It should be noted that the use of wildcard characters like * in the method names and thread names can be employed according to embodiments of the invention. For example, consider the user input trace_method:

trace_method=java/lang/S*.indexOf

When the wildcard char * is handled, methods with name as indexOf and belonging to package java.lang and any class whose name starts with S are traced. Similar use of wildcard characters for trace_thread option is supported by embodiments of the invention as well.

Figure 3:
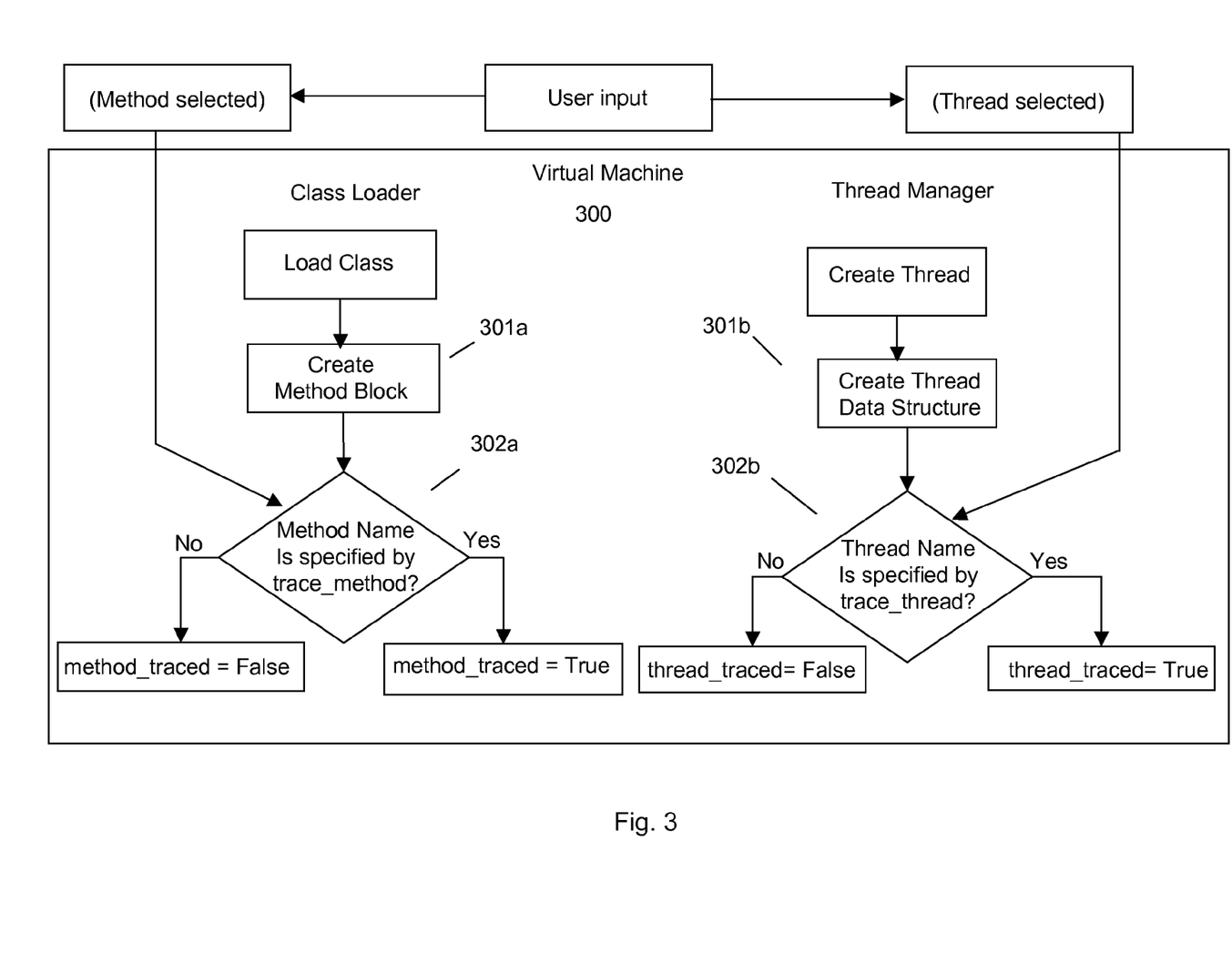
FIG. 3 illustrates method and thread flagging an embodiment of the invention.

Some implementation details are as follows. According to embodiments of the invention, flags are set in two different components of the same virtual machine to implement thread-specific tracing. Referring to FIG. 3, in a VM 300, a method block is associated with each method and is used by an interpreter to invoke the method 301a. When classes are loaded by the Class Loader component, a method block structure is created for each method in the class, a "trace_method" option is parsed and a Boolean/flag (for example, "method_traced") is set according to the user selections. The method name for which method block is being created is compared against names in the "trace_method" option (set by the user/programmer). If a match is found, Boolean "method_traced" is set to true 302a, otherwise, it is set to false.

In the Thread Manager component in the VM 300, threads are created with names associated to them. Importantly, a data structure is associated 301b with each thread. Each thread's data structure has a local Boolean/flag (for example, "thread_traced") which is basically used to achieve per thread tracing and is set 302b according to the user selections. Whenever a thread is created, the thread's name is compared against names in the "trace_thread" option (set by the user/programmer). If a match is found, Boolean "thread_traced" is set to true 302b, otherwise, it is set to false.

Figure 4:
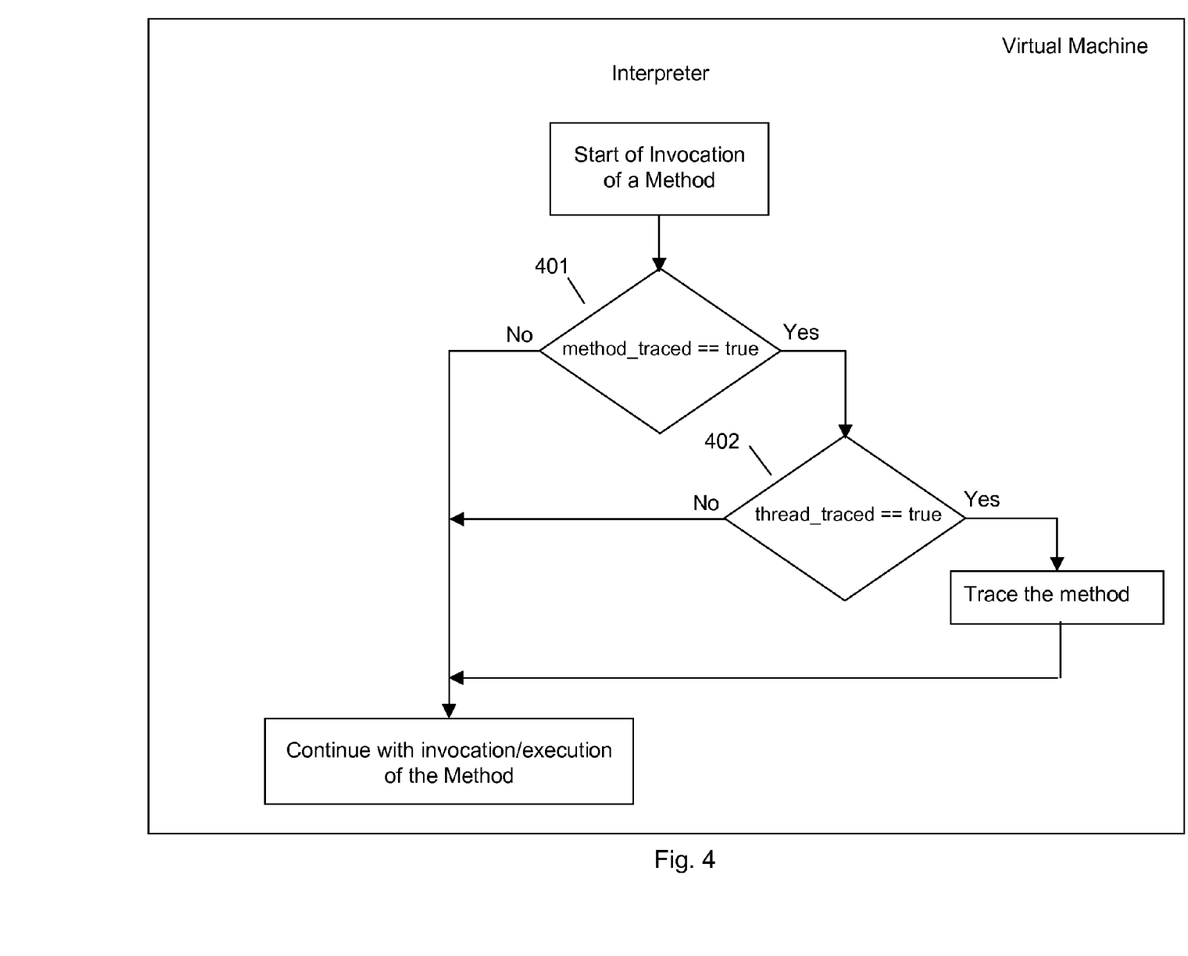
FIG. 4 illustrates thread specific tracing according to an embodiment of the invention.

Turning to FIG. 4, the status of the flag in the method block is checked 401 when the interpreter invokes a method to determine whether the method is included within the selection. If it is determined that this method is included within the selection to be traced, upon entry of the specified method, the "thread_traced" flag for the current thread is checked 402. If "thread_traced" is set to true, then trace output for this method is produced.

While thread specific tracing can be completed by embodiments of the invention as described above, some special cases that need to be considered include the following. First, it is quite possible that more than one thread has same name. That scenario can be handled in one of the following ways. The same tracing options can be applied to all the threads with same name. Alternatively, the tracing option can be applied to the first thread created with the specified name and any subsequent threads with the same name could be disregarded.

Another special case is that it is possible that name of a thread is changed during execution (that is, after it has been created with some other name). In this scenario, the function to change the thread name can be intercepted and the new thread name compared against names in the "trace_thread" option. If a match is found, Boolean "thread_traced" is set to true, otherwise, it is set to false.

Accordingly, the exemplary embodiments of the invention described herein provide a method to trace specific functions when run by specific threads in a run-time environment or virtual machine. Moreover, there is no need for post processing of the trace data to get thread specific trace information. In addition, the programmer need not access or modify the source code. Still further, no runtime instrumentation (byte code instrumentation) is required, which simplifies the tracing process. The simplified tracing process according to embodiments of the invention provide an automatic setting using control blocks of the run-time environment or Virtual Machine, which enables programmers to easily provide tracing data without become entangled in complicated approaches.

Although there are many, an exemplary scenario/business case in which the embodiments of the invention, as described herein, can be useful include use in a web server environment. In such an environment, it is common to have a huge number of methods written for a generic purpose. It is also common to have a huge number of threads (created by middleware as well as by the applications deployed). Under these circumstances, some methods when used in a context specific to a thread (or a group of threads) can cause a problem as discussed herein (that is, one method/multiple threads). Naturally, problem determination would need tracing of the methods. At the same time, one needs to ensure that overhead to the system by tracing frequently used methods is avoided (for example, considering the fact that methods are used by lot of other threads as well). In such a scenario, embodiments of the invention as described herein would prove to be very useful as they avoid production of unnecessary tracing data for uninteresting threads happening to use the same method.

By implementing embodiments of the invention, a VM is made to be more consumable, as customers will have more and better options to control tracing of the code (both library and application code) while developing/running applications. Also, consider a situation where one needs to understand the control flow of a particular thread (in a system that has huge number of threads). This cannot be easily achieved by tracing all the methods and then post processing them, because tracing all the methods leads to overloading of the system. However, embodiments of the invention allow for just such tracing information to be easily produced.

In brief recapitulation, embodiments of the invention provide a mechanism for a run-time environment or virtual machine to utilize method blocks and thread structures to provide thread-specific tracing. Among other advantages, the embodiments of the invention allow for automated tracing data to be easily produced without a need to know/access/modify the underlying source code. Moreover, embodiments of the invention avoid system overload and time consuming post-processing by avoiding the production of useless tracing data for threads happening to utilize the same method.

It should be noted as well that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   one or more processors; and
   a computer readable storage medium having computer readable program code embodied therewith and executable by the one or more processors, the computer readable program code comprising:
      computer readable program code configured to select a method for tracing;
      computer readable program code configured to select a thread for tracing; and
      computer readable program code configured to output thread-specific tracing data in response to at least one identifying aspect of the thread selected, invoking the method selected in one of a run-time environment and a virtual machine;
   wherein the at least one identifying aspect comprises a thread name, and the computer readable program code configured to output thread-specific tracing data in response to the thread selected invoking the method selected is further configured to apply tracing options that are identical for two or more threads having a same name; and
   at least one of the following (a) or (b):
      (a) the computer readable program code configured to output thread-specific tracing data in response to the thread selected invoking the method selected being further configured to apply a tracing option to a first selected thread created with a specified name and disregard any subsequent threads with the specified name; or
      (b) computer readable program code configured to intercept a thread name change for a thread selected for tracing and provide tracing output for the thread selected that has undergone a name change.

2. The apparatus according to claim 1, wherein the computer readable program code configured to select a method for tracing is further configured to set a flag for a method block of one of a run-time environment and a virtual machine corresponding to said method selected in response to selection of said method.

3. The apparatus according to claim 2, wherein the computer readable program code configured to select a thread for tracing is further configured to set a flag for a thread data structure corresponding to said thread selected in response to selection of said thread.

4. The apparatus according to claim 3, wherein the computer readable program code configured to output thread-specific tracing data in response to the thread selected invoking the method selected is further configured to:

in response to an interpreter invoking a method, determine if said method has been selected; and in response to a determination that said method has been selected, determining if a thread invoking the method has been selected.

5. The apparatus according to claim 1, further comprising a user interface configured to permit selection of one or more methods and one or more threads for tracing.

6. The apparatus according to claim 5, wherein said user interface provides one or more of a method select option and a trace select option; wherein said method select option comprises an option for indicating a fully qualified name of a method to be traced; and wherein said trace select option comprises an option for indicating a name of a thread on which tracing will be done upon hitting said fully qualified method.

7. The apparatus according to claim 1, wherein said apparatus is a web server.

8. A method comprising:
selecting a method for tracing;
selecting a thread for tracing; and
outputting thread-specific tracing data in response to at least one identifying aspect of the thread selected, invoking the method selected in one of a run-time environment and a virtual machine, wherein the at least one identifying aspect comprises a thread name;
said outputting further comprising applying tracing options that are identical for two or more threads having a same name; and
at least one of the following (a) or (b):
(a) said outputting further comprising applying a tracing option to a first selected thread created with a specified name and disregarding any subsequent threads with the specified name; or
(b) intercepting a thread name change for a thread selected for tracing and providing tracing output for the thread selected that has undergone a name change.

9. The method according to claim 8, wherein the selecting a method for tracing further comprises setting a flag for a method block of one of a run-time environment and a virtual machine corresponding to said method selected in response to selection of said method.

10. The method according to claim 9, wherein the selecting a thread for tracing further comprises setting a flag for a thread data structure corresponding to said thread selected in response to selection of said thread.

11. The method according to claim 10, wherein the outputting thread-specific tracing data in response to the thread selected invoking the method selected further comprises:

in response to an interpreter invoking a method, determining if said method has been selected; and in response to determining that said method has been selected, determining if a thread invoking the method has been selected.

12. The method according to claim 8, further comprising providing a user interface configured to permit selection of one or more methods and one or more threads for tracing.

13. The method according to claim 12, wherein said user interface provides one or more of a method select option and a trace select option; wherein said method select option comprises an option for indicating a fully qualified name of a method to be traced; and wherein said trace select option comprises an option for indicating a name of a thread on which tracing will be done upon hitting said fully qualified method.

14. A computer program product comprising:
a computer readable storage medium having computer readable program code embodied therewith, the computer readable program code comprising:
computer readable program code configured to select a method for tracing;
computer readable program code configured to select a thread for tracing; and
computer readable program code configured to output thread-specific tracing data in response to at least one identifying aspect of the thread selected, invoking the method selected in one of a run-time environment and a virtual machine;
wherein the at least one identifying aspect comprises a thread name, and the computer readable program code configured to output thread-specific tracing data in response to the thread selected invoking the method selected is further configured to apply tracing options that are identical for two or more threads having a same name; and
at least one of the following (a) or (b):
(a) the computer readable program code configured to output thread-specific tracing data in response to the thread selected invoking the method selected being further configured to apply a tracing option to a first selected thread created with a specified name and disregard any subsequent threads with the specified name; or
(b) computer readable program code configured to intercept a thread name change for a thread selected for tracing and provide tracing output for the thread selected that has undergone a name change.

* * * * *